United States Patent [19]
Stephenson

[11] Patent Number: 5,808,389
[45] Date of Patent: Sep. 15, 1998

[54] APPARATUS AND METHOD FOR STARTING A SINGLE-PHASE VARIABLE RELUCTANCE MOTOR

[75] Inventor: John Michael Stephenson, Halifax, United Kingdom

[73] Assignee: Switched Reluctance Drives, Ltd., United Kingdom

[21] Appl. No.: 697,926

[22] Filed: Sep. 3, 1996

[30] Foreign Application Priority Data

Sep. 5, 1995 [GB] United Kingdom ............ 9518099

[51] Int. Cl.⁶ .................. H02K 17/32; H02K 11/00; H02P 1/46
[52] U.S. Cl. ................ 310/168; 310/168; 310/68 B; 318/701
[58] Field of Search .................. 318/701, 254, 318/439, 382, 696, 137; 310/68, 166, 168, 68 B, 122

[56] References Cited

U.S. PATENT DOCUMENTS

| | | | |
|---|---|---|---|
| 1,259,295 | 3/1918 | Rosenberg | 318/137 |
| 2,790,124 | 4/1957 | Eisele | 318/254 |
| 3,581,183 | 5/1971 | Piazza et al. | 310/696 |
| 4,364,005 | 12/1982 | Kohzai et al. | 322/31 |
| 4,442,392 | 4/1984 | Hore | 318/448 |

FOREIGN PATENT DOCUMENTS

601818 A1  6/1954  United Kingdom.

*Primary Examiner*—Layton E. LaBalle
*Attorney, Agent, or Firm*—Arnold, White & Durkee

[57] ABSTRACT

An apparatus and method for starting a single-phase variable reluctance motor defined by a stator having one or more pairs of projecting poles defining a principal axis and a rotor mounted on a rotatable shaft co-axial with the principal axis of the stator is provided. The apparatus includes a device for preventing the rotor from being halted in a position of zero-developed torque thereby enabling reliable starting of the motor. The device includes a vane defined by a ferromagnetic disk having alternating mark regions and space regions which is mounted to the rotatable shaft and may form part of a rotor position transducer. A permanent magnet is positioned so as to move the vane into a position at which starting torque of the desired direction will be developed when the motor is energized. A further embodiment combines the magnet with a Hall-effect sensor so that, in conjunction with the vane, a rotor position transducer is formed.

28 Claims, 7 Drawing Sheets

APPARATUS AND METHOD FOR STARTING A SINGLE-PHASE VARIABLE RELUCTANCE MOTOR

FIELD OF THE INVENTION

The present invention relates generally to variable reluctance motors, and more particularly, is directed to a single-phase variable reluctance motor that employs a device for preventing the rotor from being halted near a minimum torque position thereby enabling reliable starting of the motor.

BACKGROUND OF THE INVENTION

Single-phase variable reluctance motors are well known in the art. They are particularly simple to construct and can operate with a low-cost electronic controller. The single-phase variable reluctance drive is, therefore, an attractive choice for use in certain cost-sensitive applications such as fans and pumps.

These brushless motors employ one or more exciting windings and a magnetic circuit to produce mechanical torque that is substantially proportional to the square of the winding ampere-turns and to the angular rate of change of the magnetic circuit inductance, which is a function of the displacement of the rotor in the motor. Typically, single-phase variable reluctance motors employ a stator containing one or more windings and a rotor mounted within the stator on bearings. Displacement of the rotor relative to the stator produces a variation of the reluctance of the magnetic circuit.

The torque produced by a variable reluctance motor is substantially proportional to the product of the square of the winding ampere-turns and the angular rate of change of inductance as a function of rotor displacement. Accordingly, motor torque that is positive with respect to some arbitrary reference can only be developed when winding ampere-turns are sustained during an interval in which the inductance increases with rotor displacement. Conversely, negative motor torque is developed when winding ampere-turns are sustained during an interval in which the inductance decreases with rotor displacement. In order to secure continuous rotation of the variable reluctance motor, it is necessary to apply ampere-turns to the motor winding during intervals of increasing inductance and to decrease or eliminate such ampere-turns during intervals of decreasing inductance.

From the foregoing, it is apparent that the winding(s) of the variable reluctance motor must be excited from a time varying source, although current flow may be uni-directional. Furthermore, the time variations of the source must be synchronized with the mechanical rotation of the rotor so that winding current is supplied to the motor during intervals in which the inductance increases with displacement and so that such current is decreased or, preferably, eliminated during the intervals in which the inductance is decreasing with rotor displacement. When a time-invariant source of electrical energy, such as a direct current source, is used, a controller is required to produce synchronized pulsations of control voltage or current. The instants at which the pulses are applied to and removed from the winding(s) can be determined by a rotor position transducer (RPT) that sends data describing the rotor position to the controller.

Figure 1:
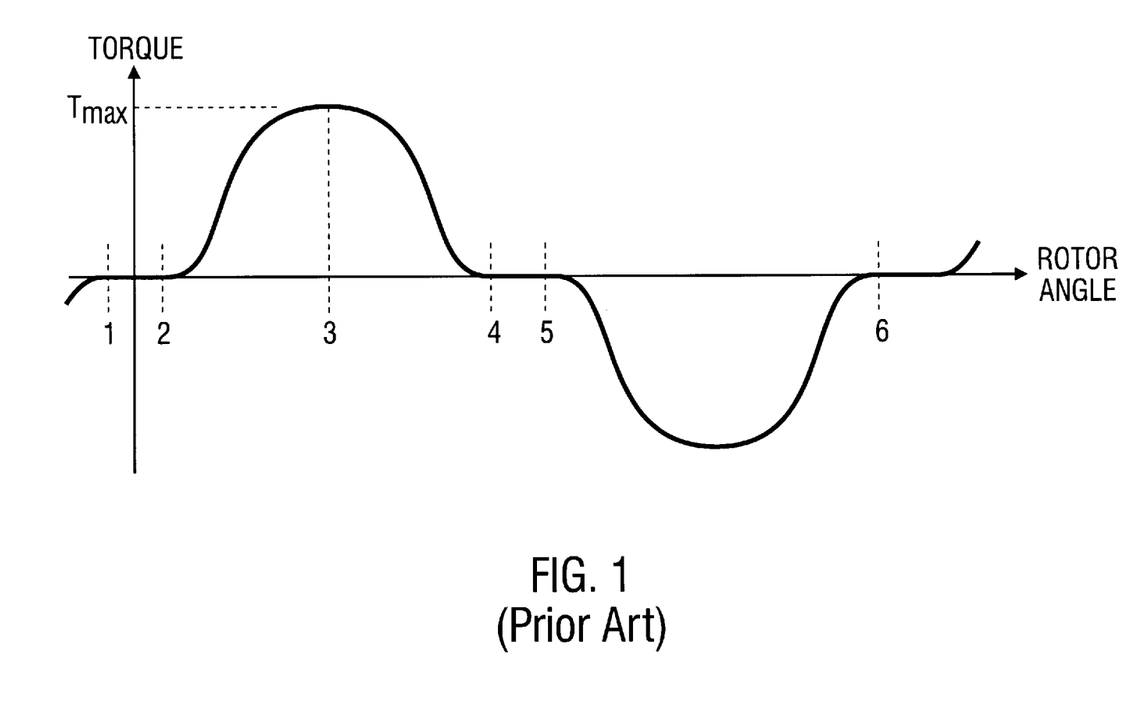
FIG. 1 shows an exemplary plot of starting torque against angular displacement of the rotor for constant current for a single-phase variable reluctance motor.

FIG. 1 shows a typical plot of starting torque against angular rotor displacement for constant current for a known single-phase variable reluctance motor. It will be seen that the machine only develops torque in, for example, the positive direction between points 2 and 4. To rotate in the desired direction, the motor would preferably only have current supplied to its exciting coil(s) when the rotor position is between points 2 and 4. Further, the motor preferably would not have current supplied when the rotor position is between points 5 and 6 because in this position a counter torque is generated. In the regions between points 1 and 2 and between points 4 and 5, current flowing will produce virtually no torque. Thus, the average torque in the desired direction over a complete cycle is much less than the peak torque $T_{max}$.

As FIG. 1 indicates, the average starting torque of single-phase variable reluctance motors is low. This is generally not a problem for low-torque applications such as fans, but is a problem for high-torque applications such as conveyors on assembly lines. A more significant drawback with single-phase variable reluctance motors that is clear from FIG. 1 is that the rotor may assume a position at rest at which little or no torque is developed in the desired direction and, hence, from which it is impossible to start the motor. This corresponds to any position in the regions defined by points 1–2 and points 4–6.

A solution to this problem has been to use small permanent magnets to "park" the rotor in a position at which it can generate adequate starting torque, e.g. point 3 in FIG. 1. Such solutions have been described in, for example, European Patent Application Nos. 163328 and 601818. These patents disclose the use of one or more small permanent magnets suitably affixed within the stator structure at an appropriate angle for "parking" the rotor in a position where sufficient torque is developed to restart the motor. As described above, there is a critical region in which the rotor must not stop if the motor is to start again. The magnetic torque developed by the magnetic field of the magnet outside this critical region must be sufficient to overcome the friction due to the bearings and any load on the motor or the rotor may stop in the critical area. The motor will not start if this should occur. The parking magnets ensure that the rotor stops in a position from which the motor can be restarted.

One disadvantage with parking magnets as used in the known systems is that the parking magnets take up physical space and require additional manufacturing steps to properly position them.

It is an object of the present invention to overcome these and other disadvantages of the prior art.

SUMMARY OF THE INVENTION

The present invention is directed to an apparatus and method for starting a single-phase variable reluctance motor. The motor includes a stator having a plurality of projecting poles defining a principal axis and a rotor rotatably mounted co-axial with the principal axis of the stator. In one embodiment, the stator poles are inwardly projecting and terminate at a central bore. In that embodiment, the rotor is rotatably disposed within the central bore. The stator poles are arranged generally symmetrically around the principal axis. The rotor poles are generally symmetrically disposed. The stator and rotor are typically formed from laminations of a ferromagnetic material. Energizing coils are wound around one or more of the stator poles. When energized, the energizing coils set up magnetic flux in the magnetic circuit of the machine. This flux imparts a torque on the rotor. The position of the rotor is sensed by a rotor position transducer (RPT).

In one aspect of the invention, the motor is prevented from coming to rest in a minimum or maximum inductance position. This is accomplished through the use of a magnet acting on a ferromagnetic vane coupled to the rotor. In another aspect of the invention, the magnet serves the dual function of parking the rotor and of forming part of a Hall-effect RPT. In this embodiment, the vane may also serve a dual function of acting to park the rotor and also forming part of the RPT. This aspect of the invention takes advantage of the inherent force produced by some types of RPTs which use Hall-effect devices. This inherent force, in combination with the ferromagnetic vane, ensures that the rotor does not come to rest at a position where insufficient starting torque will be produced. This invention is not restricted to positioning the rotor in a fixed, singular position. Rather, the invention herein described prevents the rotor from coming to rest between certain angular positions without requiring the rotor to come to rest at a certain, fixed position. This is designed to ensure reliable starting of the motor.

BRIEF DESCRIPTION OF THE DRAWINGS

The foregoing and other features of the present invention will be best appreciated with reference to the detailed description of the preferred embodiments of the invention, which follows when read in conjunction with the accompanying drawings, wherein.

DETAILED DESCRIPTION OF THE INVENTION

Figure 2:
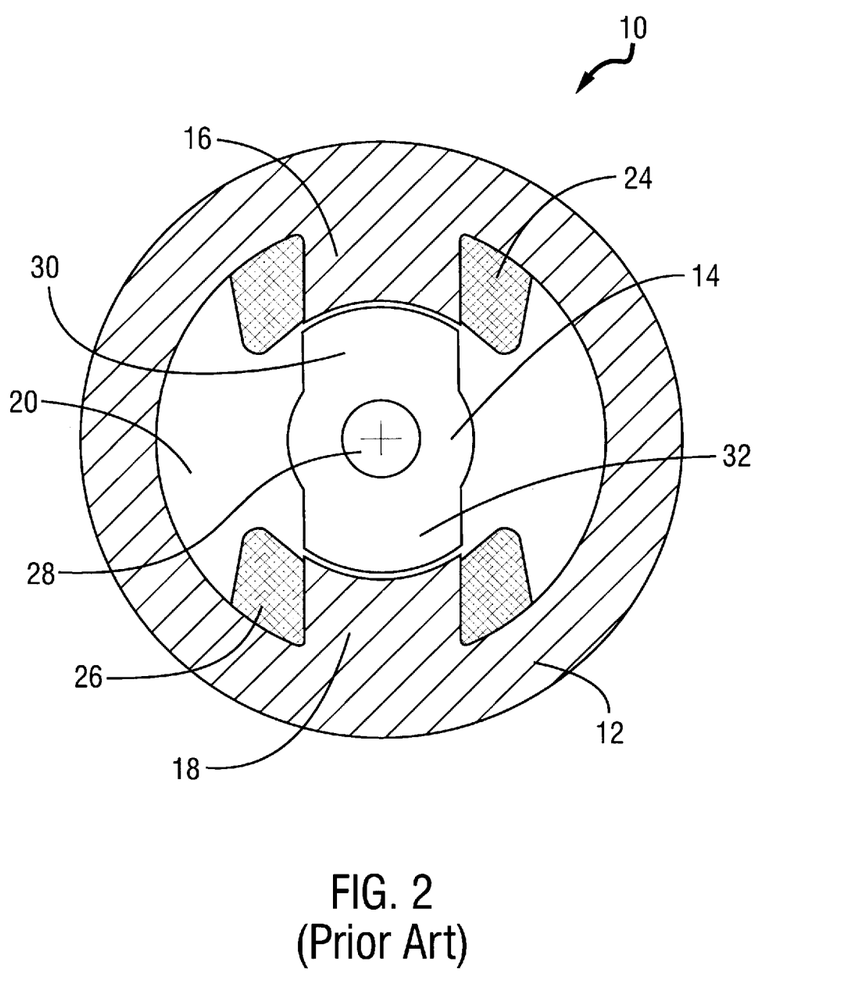
FIG. 2 is a diagram of a prior art single-phase variable reluctance motor.

Turning now to the drawings and referring initially to FIG. 2, a prior art single-phase variable reluctance motor is shown generally by reference numeral 10. For the sake of illustration, the simplest form of motor having two stator poles and two rotor poles (i.e., a 2/2 motor) is shown here. Those skilled in the art will recognize that 4/4, 6/6, and other combinations are possible and that the present invention applies also to such motors. Furthermore, the present invention is applicable to inverted motors where the stator is positioned within the bore of an outer rotating rotor.

The motor 10 comprises a stator 12 and a rotor 14. The stator 12 has a pair of projecting poles 16 and 18 that define a principal stator axis extending outward from FIG. 2. In FIG. 2, the poles 16 and 18 are radially inwardly extending and terminate at a central bore 20. The poles 16 and 18 are disposed at 180 degrees with respect to each other. The stator 12 and the rotor 14 are formed from laminations of a ferromagnetic material. Energizing coils 24 and 26 are wound around the poles 16 and 18, respectively. In one embodiment, the energizing coils 24 and 26 are wound 220 turns around each pole 16 and 18, although a different number of turns may be used. The energizing coils 24 and 26, when energized, cause a temporary magnetization of the stator poles 16 and 18.

The rotor 14 has two radially outwardly projecting poles 30 and 32. The rotor 14 is mounted to a rotatable shaft 28 co-axial with the principal axis of the stator 12. In FIG. 2, the rotor poles 30 and 32 are outwardly extending and the rotor 14 is rotatably disposed in the central bore 20.

When the energizing coils 24 and 26 are energized, typically by applying voltage to them from a power source (not shown), a magnetic field is set up in the motor. This field attracts the poles 30 and 32 on the rotor 14 to the poles 16 and 18 on the stator 12 thereby imparting a torque on the rotor.

Figure 3A:
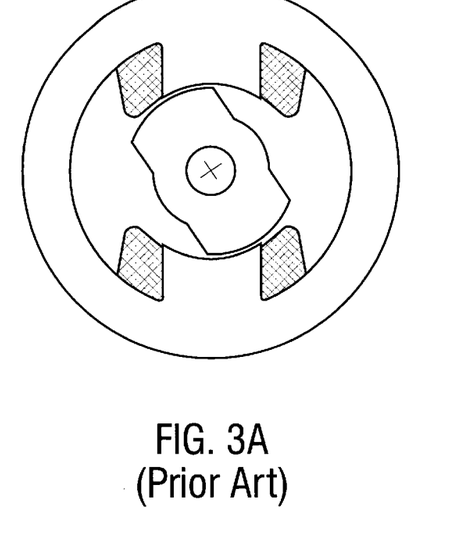
FIGS. 3A–D are diagrams of the motor shown in FIG. 2 illustrating various positions of the rotor relative to the stator poles.

When the rotor 14 is in position A (shown in FIG. 3A) and the stator poles 16 and 18 are energized, a substantial torque is imparted to the rotor 14. This generally corresponds to position 3 in FIG. 1. If clockwise rotation is required, the stator poles 16 and 18 remain energized until the rotor 14 reaches the fully aligned position, shown in FIG. 3B. In the fully aligned position, no torque is imparted to the rotor 14. This generally corresponds to the region between points 4 and 5 in FIG. 1. During operation, at or around the instant that the rotor 14 passes through this position, the stator poles 16 and 18 are de-energized thus allowing the rotor 14 to freely rotate. If the stator poles 16 and 18 were not de-energized at or near this point, a negative torque (illustrated by the portion of the graph in FIG. 1 between points 5 and 6) would be applied to the rotor 14 thus attempting to reverse its direction of rotation. As explained above, if the rotor 14 comes to rest in the fully aligned position when the motor 10 is turned "off", it cannot be restarted by the electromagnetic force generated by the "energized" stator poles 16 and 18 alone. It remains stuck in this position.

In position C (shown in FIG. 3C), the stator poles 16 and 18 remain de-energized thereby allowing the rotor 14 to freely rotate. The rotor 14 freely rotates in the clockwise direction until it reaches position D (shown in FIG. 3D), known as the minimum inductance position. This point corresponds generally to the region between points 1 and 2 in FIG. 1. No torque is imparted to the rotor 14 in this position. At or around the instant that the rotor 14 passes through position D, the stator poles 16 and 18 are once again energized thereby imparting a torque to the rotor which increases to a maximum value once the rotor 14 again reaches position A. The rotor 14 rotates through 180 degrees as it rotates from position A, through positions B, C, and D and back to position A, as shown in FIGS. 3A–D.

Figure 4:
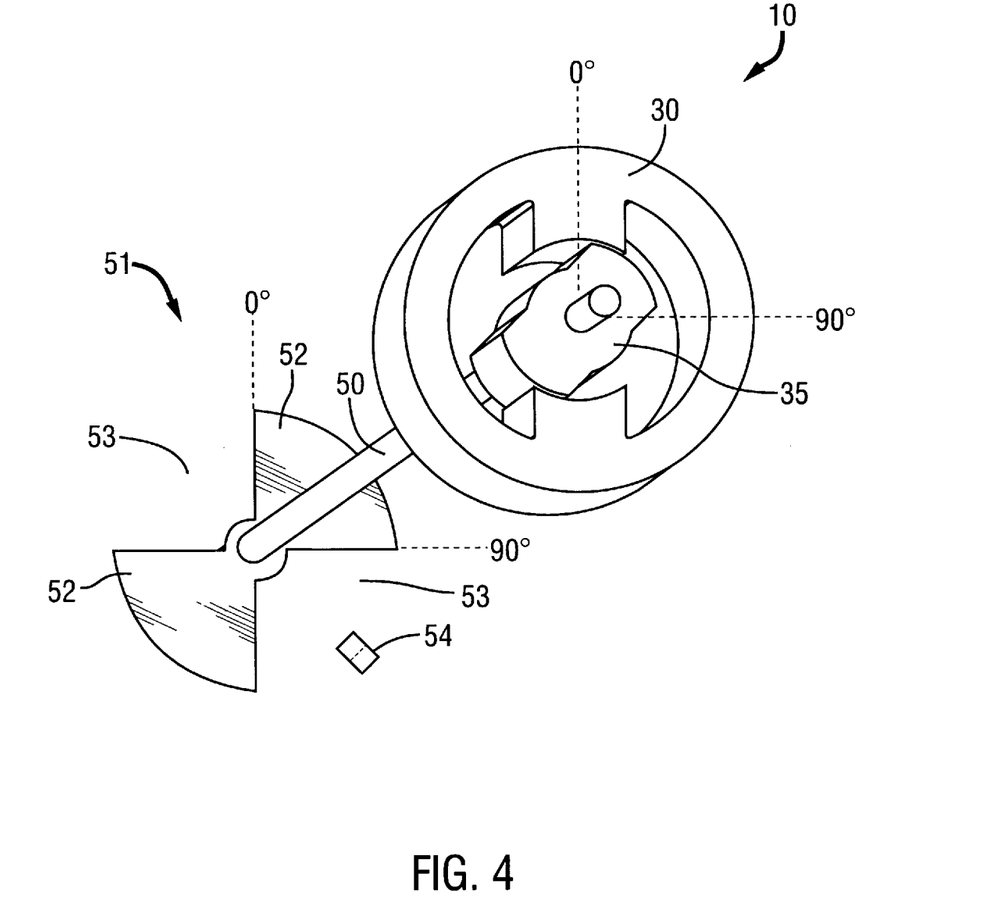
FIGS. 4 and 5 are diagrams of one embodiment of a rotor positioning device for a single-phase variable reluctance motor according to the present invention shown in positions of non-minimum and non-maximum inductance.
Figure 5:
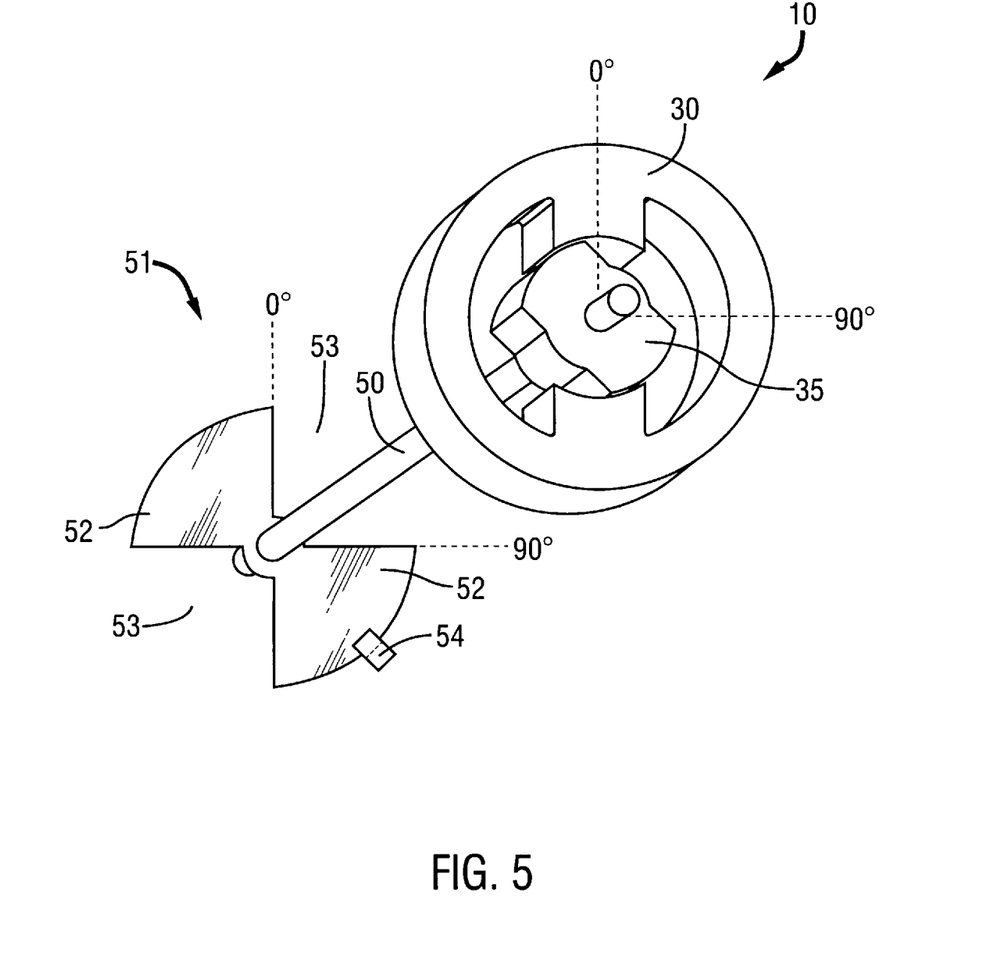

FIGS. 4 and 5 generally illustrate a single-phase variable reluctance motor system constructed in accordance with one aspect of the present invention. The system generally includes a variable reluctance motor 10, including a stator 30 and a rotor 35. The rotor 35 is attached to one end of a rotatable shaft 50. A ferromagnetic vane 51 is attached to the other end of the rotatable shaft 50. The rotor 35 and vane 51 rotate with the rotatable shaft 50. The vane 51 has two different regions: mark regions 52 and space regions 53. A vane forms part of a rotor position transducer which includes a sensing element 54. In this embodiment, the sensing element includes a Hall-effect device and a permanent magnet. The magnetic field of the magnet influence the output of the Hall-effect device. As the vane rotates, the mark and space regions alternately interrupt and restore the influence of the magnet on the Hall-effect device so that its output changes. In known single-phase variable reluctance motors, each mark region 52 and space region 53 of the vane 51 is substantially equal, with each being generally defined by an arc of approximately $(180/N_r)$ degrees, where $N_r$ is the number of rotor poles.

In operation, the sensing element 54 produces a first signal of one logic value (e.g., "logic 1") when a mark region of the vane 51 is interposed between the magnet and the Hall-effect device and produces a second signal of a different logic level (e.g., "logic 0") when a space region of the vane is passing the sensing element. As those skilled in the art will recognize, when a vane 51 having, say, two equal mark/space regions is utilized over each 180 degree rotation of the rotor 35, the sensing device 54 will produce a logic "1" signal over half of the rotation and a logic "0" signal over the other half of the rotation. Since the construction of the vane 51 is symmetric, the signal repeats over the period of rotation from 180 degrees to 360 degrees.

In known single-phase variable reluctance motors the output from the single sensing device 54 can be used to control the energization of the motor 10. For example, during the interval when the output of the sensing element 54 is logic "1", the phase winding is normally energized. During the interval over which the output of sensing device 54 is logic "0," the phase winding is de-energized. As those skilled in the art will recognize, the electronics required to convert the output of sensing device 54 into a switching signal for the phase winding are straightforward and can be constructed at low cost. Other control schemes are known in the art.

There are a number of types of vanes 51 and sensing devices 54 that can be used in switched reluctance motors. For example, vane 51 can comprise a disk having light transmissive and light blocking (or relatively more light reflecting and absorbing) elements that define the mark and space regions, and sensing element 54 can comprise a sensor with a light producing element and a light detecting element where the mark regions of the vane 51 interrupt the light beam from the source to the detector. For such optically-based systems, it is sometimes desirable to slightly adjust the angular extent of the mark regions to compensate for the finite width of the light beam so that sensing element 54 produces logic high and logic low signals of equal duration.

For the type of sensing device illustrated in FIG. 4, it is known to adjust the angular expanse of the mark region to compensate for the proximity effect of flux fringing in the air adjacent to the ferromagnetic vane 51. This adjustment is made so that the sensing element 54 produces logic high and logic low signals of equal duration.

The output of the sensing element 54 is provided to an electronic controller (not shown) that controls the energization of the phase windings of motor 10.

Figure 3B:
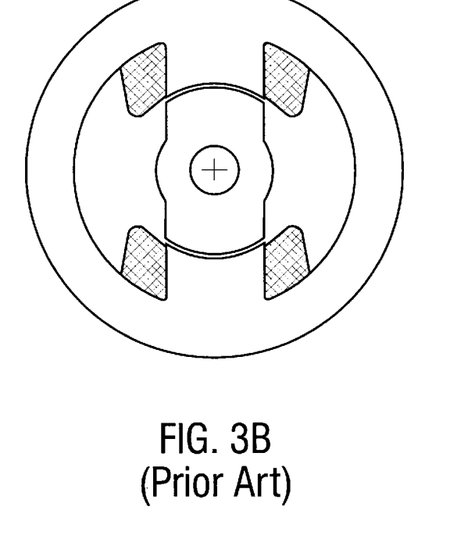
Figure 3C:
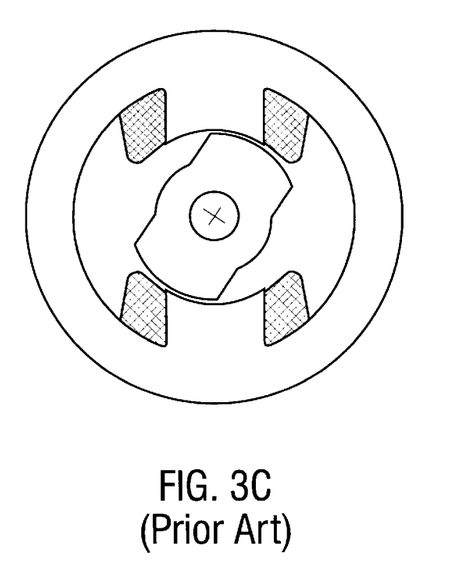
Figure 3D:
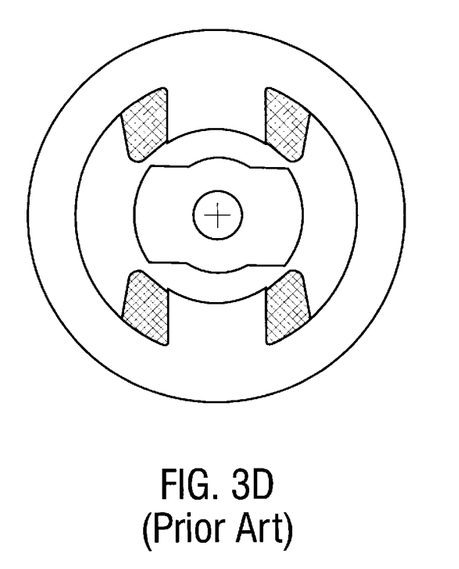

As illustrated in FIGS. 3B and 3D, single-phase variable reluctance motors have both maximum and minimum inductance positions at which no starting torque is produced. The motor system shown in FIG. 4 illustrates the rotor 35 at rest in a non-minimum and non-maximum inductance position. From this position, starting torque would be developed in an anti-clockwise direction. In accordance with the invention disclosed herein, the vane 51 is constructed and positioned so as to have no part of the vane positioned immediately adjacent to, or within, the sensing element 54. A second non-minimum and non-maximum inductance position is shown in FIG. 5. In this position, the rotor 35 and vane 51 are positioned so that the motor system of FIG. 5 can be reliably started in the clockwise direction. The construction and operation of the vane 51 in combination with the sensing element and permanent magnet 54, is such that if the rotor 35 comes to rest in the illustrated position, the mark region of the vane will remain entirely within the confines of the sensing element 54.

Figure 6:
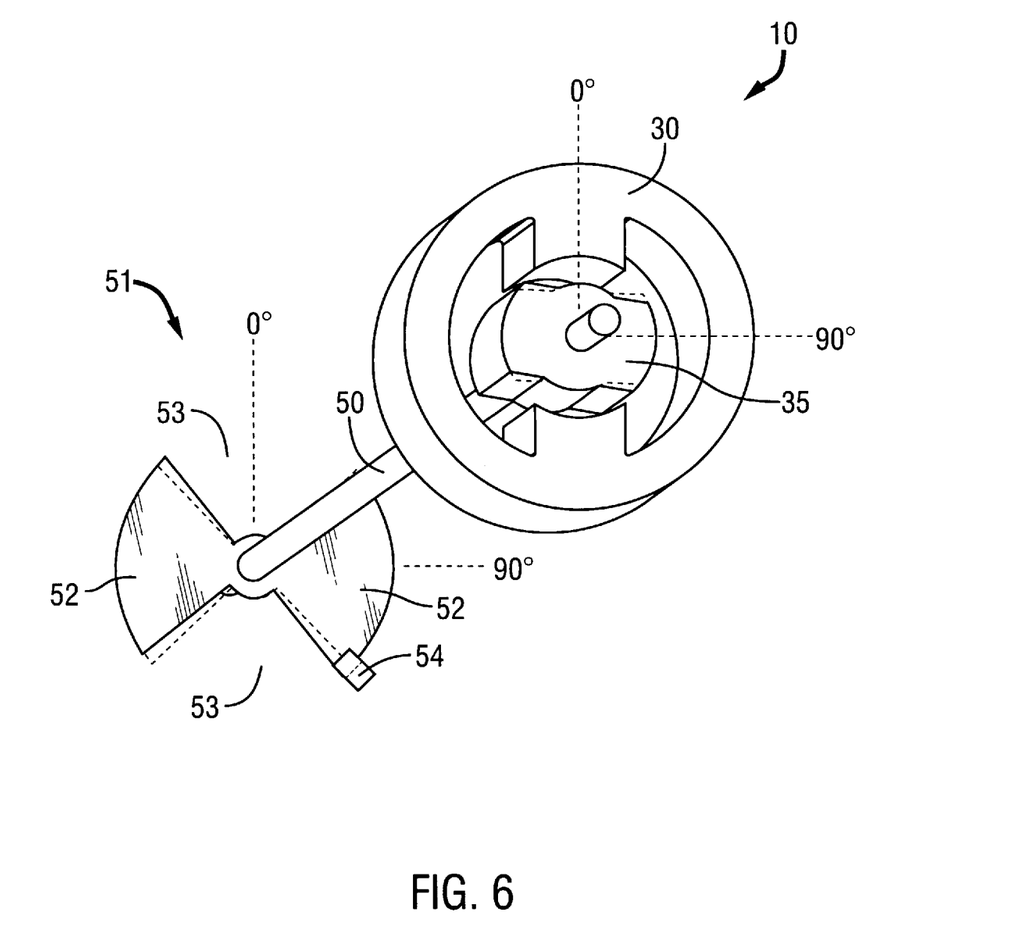
FIGS. 6 and 7 are diagrams of the rotor positioning device shown in FIGS. 4 and 5 with the rotor in a position of minimum inductance (shown by the dotted lines) and in a position of maximum inductance (shown by the dotted lines), respectively.

Referring now to FIG. 6, the rotor 35 is shown (by the dotted lines) in a position at which it will develop very little torque. From this position, unless additional torque is applied, the motor system cannot be reliably started. Such additional torque is provided by the invention disclosed herein. The construction and operation of the ferromagnetic vane 51 in combination with the sensing element 54, is such that if the vane 51 comes to rest at the position shown by the dotted lines in FIG. 6, the permanent magnet will exert a torque on the shaft through the mark region of the vane 51 so that it comes to rest with the mark region in the field of the magnet. This is shown by the solid lines of the vane 51 in FIG. 6. Because the vane 51 is linked by shaft 50 to the rotor 35, when the vane 51 rotates, necessarily the rotor 35 also rotates. As the rotor 35 rotates in conjunction with the vane 51, the rotor 35 rotates out of the position of minimum inductance and to a position intermediate minimum and maximum inductance so that the motor system can be reliably started. In the example illustrated in FIG. 6, the vane 51 and rotor 35 will rotate in a clockwise fashion from the minimum inductance position shown by the dotted lines to the non-minimum induction position shown by the solid lines.

Figure 7:
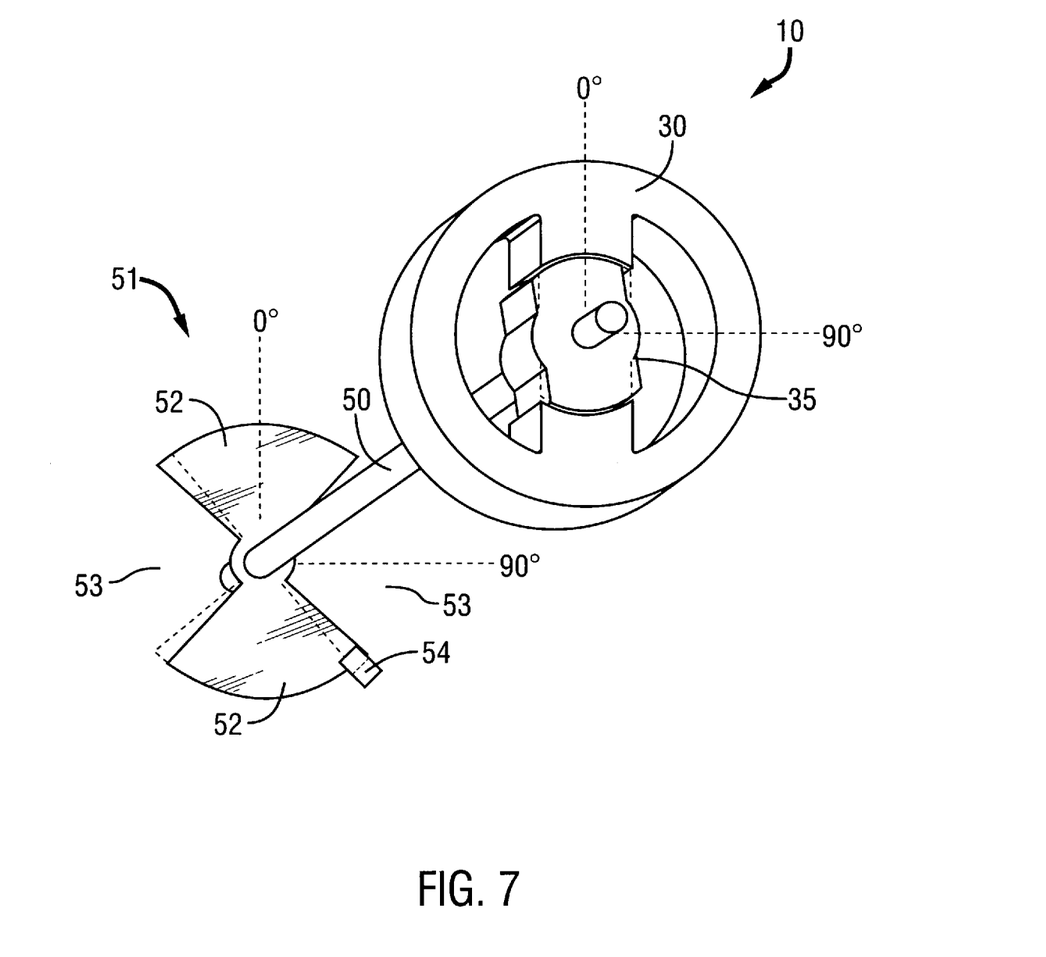

FIG. 7 illustrates the rotor 35 in a maximum inductance position (shown by the dotted lines). This situation is substantially similar to the situation illustrated in FIG. 6. In accordance with the invention disclosed herein, and by virtue of the construction and operation of the vane 51 and permanent magnet, the vane 51 and rotor 35 will rotate from the position of maximum inductance (shown by the dotted lines) to a position of non-maximum inductance (shown by the solid lines). In this case, the rotation will be in a counter-clockwise direction. Thus, both the vane 51 and rotor 35 will rotate out of the position of maximum inductance and to a position of non-maximum inductance from which the motor system may be reliably started in a clockwise direction.

As can be seen from FIGS. 6 and 7, the positioning of the sensing element 54 and the construction of the vane 51 is dependent upon the number of stator poles and rotor poles. The desired arrangement of the vane 51 and sensing element 54 is such that an edge of a mark region 52 must be within the influence of the permanent magnet of the sensing element 54 whenever the rotor 35 is in a position of either minimum inductance or maximum inductance.

The construction of the motor 10 for use in the present invention may, except for the RPT, follow conventional variable reluctance motor construction methods. For example, the stator may be constructed of a number of stacked stator laminations having stator poles around which are wound around the motor windings. The rotor may be constructed of a number of stacked rotor laminations affixed to a shaft.

The operation of RPTs using switching vanes and light detectors is well understood. Generally, a light beam is provided which passes from a light source to a detector. When the light beam is incident upon the detector, the detector produces a digital signal at a first logic level (e.g., a logic "0"). When the light beam is interrupted, for example, by the passing of a vane between the beam source and the detector, the beam is not incident on the detector and the detector produces a digital output at a second logic level (e.g., a logic "1"). In the present example, the time interval when the detector produces a logic "1" signal is referred to as the "mark" period and the time interval over which the detector produced a logic "0" signal is referred to as the "space" period.

The construction of rotor vane 51 in FIGS. 6 and 7 is exemplary only. As those skilled in the art will recognize, the present invention is applicable to other single-phase motors having different torque profiles with different regions of positive torque. In general, however, the mark regions 52 of the vane 51 should correspond to the positive torque regions of the motor. In practice, the positive torque producing region for a given motor can be calculated experimentally or, preferably, determined empirically by examination of the motor. The phase winding can be energized and the rotor can be rotated from the position corresponding to 0 mechanical degrees to 360 mechanical degrees while the resulting torque is measured through the use of known torque-measuring techniques.

As the above indicates, once the positive torque producing regions of the phase windings are known, the construction of the appropriate vane is a matter of routine to the person of ordinary skill in the art. The positive torque producing region for a given phase is determined and the mark regions of the rotor are then sized to correspond to the positive torque regions. After the mark and space regions of the vane have been determined, the RPT vane may be constructed using known cutting and manufacturing techniques.

As those skilled in the art will recognize and as generally discussed above, to generate the appropriate RPT signals, it is sometimes necessary to slightly modify the desired mark region to compensate for the fact that, in the case of an optical RPT, the light beam that is interrupted by the vane has a finite width. Similarly, for magnetic RPTs using, e.g., Hall-effect devices, the mark region may be modified to compensate for flux fringing. To the extent that compensation is required, it should be added to the vane after the mark/space regions have been determined in accordance with the present invention. When such modifications are made, the angular span of the mark region of the vane will generally, but not exactly, correspond to the positive torque producing region of the phase windings. A similar modification may be required for other types of sensing devices. In all cases, however, the aim is to produce RPT signals whose mark/space ratios correspond to and are proportional to the ratios of angular periods of positive and negative torque.

When the RPT vane is properly constructed and the sensing device or devices properly positioned in accordance with the present invention, the appropriate switching signals will be generated.

A person of ordinary skill in the art will appreciate that the purpose of the magnet is to urge the rotor into a position intermediate maximum and minimum inductance. To equal effect the forces of attraction exerted by the magnet could be replaced by forces of repulsion by, e.g., arranging a magnet on the vane in such an orientation that there is mutual repulsion between it and the Hall-effect magnet or another magnet arranged in relation to the vane for the purpose of producing the torque.

While the present invention is susceptible to various modifications and alternative forms, specific embodiments have been shown by way of example in the drawings and description herein. However, it should be understood that the invention is not intended to be limited to the particular forms disclosed. Rather, the invention is intended to cover all modifications, equivalents and alternatives falling within the spirit and scope of the invention as defined by the appended claims.

What is claimed is:

1. A single phase variable reluctance motor comprising: a stator, defining at least one stator pole; at least one phase winding for energizing the stator pole; a rotor, defining at least one rotor pole, the rotor being rotatable relative to the stator such that a magnetic circuit comprising the rotor and the stator is of cyclically variable inductance according to the position of the rotor pole with respect to the stator pole; a magnet; a member including ferromagnetic elements arranged to rotate with the rotor, both the magnet and the member being located outside the magnetic circuit, the magnet being positioned and the ferromagnetic element being arranged to prevent the rotor from coming to rest at a position of maximum or minimum inductance.

2. A motor as claimed in claim 1 in which the ferromagnetic elements define interjacent mark and space regions.

3. A motor as claimed in claim 1 including a rotor shaft on which the rotor and the member are commonly mounted.

4. A motor as claimed in claim 1 in which the ferromagnetic elements have an angular extent arranged to urge the rotor to rest in a position in which the rotor and stator poles are relatively disposed for starting the motor in a desired direction.

5. A motor as claimed in claim 1 including a sensor positioned to be influenced by the magnet to generate first and second outputs according to the positions of the ferromagnetic elements, the sensor, the magnet and the member together forming a rotor position transducer providing rotor position information according to the angular extent and spacing of the ferromagnetic elements.

6. A motor as claimed in claim 5 in which the sensor comprises a Hall-effect device.

7. A motor as claimed in claim 1 including a sensor positioned to be influenced by the movement of the ferromagnetic elements to produce an output indicative of the angular position of the rotor.

8. A motor as claimed in claim 7 in which the sensor comprises a first magnet and a sensing device, movement of the ferromagnetic element disturbing the magnetic field of the magnet to generate the output indicative of the angular position of the rotor.

9. A motor as claimed in claim 8 in which the ferromagnetic elements are arranged to rotate between the first magnet and the sensor.

10. A single-phase variable reluctance motor, comprising:
    a stator having at least one projecting pole that defines a principal stator axis;
    a rotor coupled to a rotatable shaft co-axial with the principal stator axis the rotor being rotatable relative to the stator such that a magnetic circuit comprising the rotor and the stator is of cyclically variable inductance according to the position of the rotor pole with respect to the stator pole;
    at least one energizing coil wound around the at least one stator pole forming a first winding; and
    means located outside the magnetic circuit for preventing the rotor from coming to rest in a position from which reliable restart of the motor cannot be insured.

11. The single-phase variable reluctance motor according to claim 10, wherein said means comprises a vane rotatably coupled to said rotatable shaft and a rotor position transducer disposed adjacent to said vane which detects the position of said vane.

12. The single-phase variable reluctance motor according to claim 11, wherein the vane is defined by a disk having alternating mark regions and space regions.

13. The single-phase variable reluctance motor according to claim 12, wherein the mark regions of the vane include a ferromagnetic material.

14. The single-phase variable reluctance motor according to claim 13, wherein the rotor position transducer includes a Hall-effect device which imparts a magnetic force on the vane preventing the rotor from coming to rest in a minimum or maximum inductance position when an edge of a mark region is aligned adjacent to the rotor position transducer.

15. The single-phase variable reluctance motor according to claim 12, wherein the rotor position transducer produces a first output signal having a first logic level and a second output signal having a second logic level, said first output signal being produced when said rotor position transducer senses a mark region and said second output signal being produced when said rotor position transducer senses a space region.

16. The single-phase variable reluctance motor according to claim 15, wherein the at least one energizing coil is energized during an interval when the first output signal is produced and de-energized during an interval when the second output signal is produced.

17. A single-phase variable reluctance motor, comprising:
a stator having at least one projecting pole that defines a principal stator axis;
a rotor coupled to a rotatable shaft co-axial with the principal stator axis;
at least one energizing coil wound around at least one stator pole forming a first winding; and
a rotor position transducer which detects the position of the rotor relative to the stators the rotor position transducer including a rotating member coupled to the rotor and a magnetic sensor which interacts with the rotating member to prevent the rotor from coming to rest in a position from which energizing the at least one energizing coil will not start the rotor.

18. The single-phase variable reluctance motor according to claim 17, further comprising a vane coupled to the rotatable shaft, said vane being disposed adjacent to the rotor position transducer.

19. The single-phase variable reluctance motor according to claim 18, wherein the vane is defined by a disk having alternating mark regions and space regions.

20. The single-phase variable reluctance motor according to claim 19, wherein the rotor position transducer senses whether it is adjacent to a mark region or a space region at any given instant.

21. The single-phase variable reluctance motor according to claim 20, wherein the rotor position transducer produces a first output signal having a first logic level and a second output signal having a second logic level, said first output signal being produced when said rotor position transducer senses a mark region and said second output signal being produced when said rotor position transducer senses a space region.

22. The single-phase variable reluctance motor according to claim 21, wherein said at least one energizing coil is energized during an interval when the first output signal is produced and de-energized during an interval when the second output signal is produced.

23. The single-phase variable reluctance motor according to claim 19, wherein the mark regions of the vane include a ferromagnetic material.

24. The single-phase reluctance motor according to claim 23, wherein the magnetic sensor includes a Hall-effect device, said Hall effect device imparting a magnetic force on the vane causing the vane to rotate to a position where the rotor is in a non-minimum or non-maximum inductance position when an edge of a mark region is aligned adjacent to the rotor position transducer.

25. A method of starting a single-phase variable reluctance motor including a stator defining at least one stator pole; at least one phase winding for energizing the stator pole; and a rotor defining at least one rotor pole, the rotor being rotatable relative to the stator such that a magnetic circuit comprising the rotor and the stator is of a cyclically variable inductance according to the position of the rotor pole with respect to the stator pole, said method comprising the step of applying a magnetic force to the rotor from a location outside of the magnetic circuit so as to prevent the rotor from coming to rest in a position of maximum or minimum inductance.

26. A method as claimed in claim 25 further comprising the step of cutting off the supply of energy to the at least one phase winding in the magnetic circuit prior to the rotor coming to rest.

27. A method as claimed in claim 26 further comprising the step of energizing the at least one phase winding in the magnetic circuit after the rotor has come to rest so as to start the motor.

28. A method as claimed in claim 27, in which the magnetic force being applied to the rotor from a location outside the magnetic circuit is applied by a permanent magnet acting on a member having a plurality of ferromagnetic elements that is coupled to a shaft on which the rotor rotates in the magnetic circuit.

* * * * *